Patented July 11, 1939

2,165,219

UNITED STATES PATENT OFFICE 2,165,219

PROCESS FOR THE PREPARATION OF DYES

Leslie G. S. Brooker, Rochester, N. Y., assignor, by mesne assignments, to Eastman Kodak Company, Jersey City, N. J., a corporation of New Jersey No Drawing. Application August 13, 1936, Serial No. 95,926. In Great Britain August 15, 1935

12 Claims. (Cl. 260—240)

This invention relates to a process for the preparation of dyes.

The process of my invention comprises the condensation of a compound containing a nuclear reactive methylene group with a formylmethylene derivative of the following general formula:

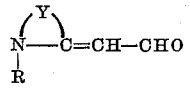

and

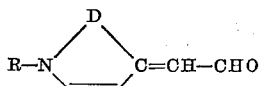

wherein D represents a vinylene or phenylene group, R represents an alkyl group and Y represents the non-metallic atoms necessary to complete a five-membered or six-membered heterocyclic nucleus, such for instance as an oxazole, for example 4-methyloxazole, 4-phenyloxazole, benzoxazole, naphthoxazole, a thiazole, for example 4-methylthiazole, 4-phenylthiazole, benzothiazole or naphthothiazole, a selenazole for example 4-methylselenazole or benzoselenazole, a pyridine, a quinoline, for example, 5-methylquinoline or benzoquinoline, a thiazoline, a selenazoline or an indolenine, for example a 3,3-dialkylindolenine nucleus.

These formylmethylene derivatives are especially reactive and can be reacted with any organic compound containing a nuclear reactive methylene group, e. g., a compound containing a nuclear methylene group adjacent to a nuclear carbonyl group, e. g., C=O or C=S. My new process is particularly well adapted to the production of merocarbocyanine dyes which are useful as photographic sensitizers. The heterocyclic compounds that can be used to produce merocarbocyanines are, for example, the following: rhodanines, such as 2-thio-2,4(3,5)-thiazoledione, 3-alkyl-2-thio-2,4(3,5)-thiazolediones, 3-aryl- particularly 3-phenyl-2-thio-2,4(3,5)-thiazolediones, 4-thiorhodanines, for example 2,4-dithio-2,4(3,5)-thiazolediones, 3-alkyl-2,4-dithio-2,4(3,5)-thiazolediones, 3-phenyl-2,4-dithio-2,4(3,5)-thiazolediones or the like, 2-thio-2,4(3,5)-oxazolediones, for example, 3-alkyl-2-thio-2,4(3,5)-oxazolediones, 4-thiazolidones, 2-dialkylamino, 2-alkylphenylamino-or 2-diphenylamino-4(5)-thiazolones pyrazolones, hydantoins, such as for example 2,4(3,5)-imidazoledione, 2-thio-2,4(3,5)-imidazolediones, 2,4-dithio-2,4(3,5)-imidazolediones, 2,4(3,5)-thiazolediones, barbituric acids (2,4,6-triketohexahydropyrimidines), thiobarbituric acids, 2,4-dihydroxyquinolines, benzocoumarin or the like.

Non-cyclic compounds which can be reacted with formylmethylene derivatives according to our new process are, for example, the following: acetylacetone, benzoylacetone, naphthoylacetone, N-alkyl or N-aryl-cyanoacetamides, malonic acid or its esters, pyruvic acid or its esters, ethyl-2-quinolylpyruvates, nitroethane, benzyl cyanide, 2,4-pentanedione, acetoacetic esters or the like.

Homocyclic compounds which can be reacted with formylmethylene derivatives according to my new process, are for example, the following: 1,3-indandione, 1,3-cyclohexanedione or the like.

A number of the above compounds containing a reactive methylene group are characterized by containing the structure:

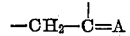

wherein A represents an atom such as oxygen or sulfur.

The formylmethylene derivatives are advantageously reacted with the compound containing the reactive methylene group in the presence of a water-binding agent. Suitable water-binding agents are acetic anhydride or other lower fatty acid anhydrides such as propionic and butyric. Heat accelerates the reaction.

The following examples serve to illustrate my invention but are not intended to be limiting.

*Example 1—3-ethyl-5-[(1-ethyl-2(1) - β - naphthothiazylidene)-ethylidene]-rhodanine*

0.13 g. (1 mol.) of 1-ethyl-2-formylmethylene-β-naphthothiazoline and 0.08 g. (1 mol.) of 3-ethylrhodanine were refluxed in 2 cc. of acetic anhydride for about 5 minutes. The dye separated from the cooled reaction mixture. After recrystallization from glacial acetic acid, the dye was obtained as beautiful dark blue needles with double blue and green reflex and melting at 283-285° C. with decomposition.

*Example 2—3-ethyl-5-[(1-ethyl-2(1)-β - naphthothiazylidene)-ethylidene]-2-thio - 2,4(3,5) - oxazoledione*

0.64 g. (1 mol.) of 1-ethyl-2-formylmethylene-β-naphthothiazoline and 0.36 g. (1 mol.) of 3-ethyl-2-thio-2,4(3,5)-oxazoledione were refluxed in 10 cc. of acetic anhydride for about 5 minutes. The dye separated from the cooled (0° C.) reaction mixture. It was washed with methyl alcohol and recrystallized from glacial acetic acid. The dye was obtained in the form of reddish brown crystals melting at 272-274° C. with decomposition.

*Example 3—1-(1-benzothiazyl) - 4 - [(1 - ethyl - 2(1) - β -naphthothiazylidene) -ethylidene] - 3- methyl-5-pyrazolone*

0.64 g. (1 mol.) of 1-ethyl-2-formylmethylene-β-naphthothiazoline and 0.58 g. (1 mol.) of 1-(1-benzothiazyl) -3-methyl-5-pyrazolone were refluxed in 10 cc. of acetic anhydride for about 5 minutes. The reaction mixture was chilled to 0° C. and the dye which separated filtered and washed with methyl alcohol. After recrystallization from glacial acetic acid, the dye was obtained as a scarlet crystalline powder, melting at 294-295° C. with decomposition.

*Example 4 — Carbethoxyformyl -[(1-ethyl - 2-β- naphthothiazylidene) -ethylidene] -quinaldine*

0.51 g. (1 mol.) of 1-ethyl-2-formylmethylene-β-naphthothiazoline and 0.5 g. (1 mol.) of ethyl 2-quinolylpyruvate (Wislicenus and Kleisinger, Berichte 42, 1140 (1909) were refluxed in 10 cc. acetic anhydride for about 3 minutes. The dye separated from the reaction mixture chilled to 0° C. It was filtered and washed with methyl alcohol. After three recrystallizations from methyl alcohol, the dye was obtained as reddish brown needles with a blue reflex, and melting at 184 to 186° C. with decomposition. Dyes of this type and their sensitizing activity are disclosed in the copending application of Leslie G. S. Brooker, Serial No. 95,930 filed August 13, 1936.

*Example 5—2-(γ,γ-diacetylallylidene) -1-ethyl-β- naphthothiazoline*

0.255 g. (1 mol.) of 1-ethyl-2-formylmethylene-β-naphthothiazoline and 0.1 g. (1 mol.) of acetylacetone were refluxed in 3 cc. of acetic anhydride for about 3 minutes. The dye separated from the reaction mixture cooled to 0° C. It was filtered and washed with methyl alcohol. After recrystallization from methyl alcohol, the dye was obtained as orange needles melting at 195°-197° C. with decomposition. Dyes of this type and their sensitizing activity are disclosed in the copending application of Leslie G. S. Brooker, Serial No. 95,930 filed August 13, 1936.

The formylmethylene derivatives used in our new process can be prepared by hydrolyzing, advantageously in alkaline media, a compound characterized by one of the following formulas:

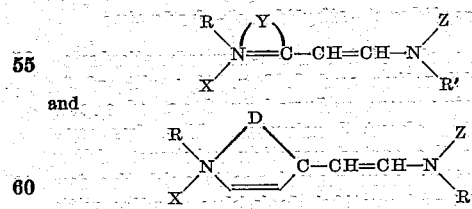

wherein D represents a vinylene or phenylene group, R represents an alkyl group, R' represents an aryl group, X represents an acid radical, Z represents hydrogen or an acyl group and Y represents the non-metallic atoms necessary to complete a five-membered or six-membered heterocyclic nucleus, such as a thiazole e. g. a naphthothiazole, a quinoline, an oxazole, etc. Such β-anilinovinyl derivatives are described in British patent 344,409. The hydrolysis of these β-anilinovinyl derivatives to produce formyl methylene derivatives is described in the copending application of Leslie G. S. Brooker, Serial No. 95,925 filed August 13, 1936. The formylmethylene derivatives derived from naphthothiazole quaternary salts are particularly useful and accordingly the illustrations have been given with reference to them. The formylmethylene derivatives of quinoline are likewise especially useful in connection with the herein described process.

The specific group of formylmethylene derivatives set forth above in connection with the formula:

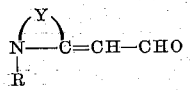

can also be represented by the formula:

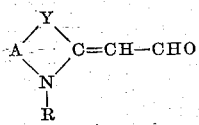

wherein A represents a vinylene, an ethylene, a phenylene or a naphthylene group when Y represents sulfur, A represents a vinylene, a phenylene or a naphthylene group when Y represents oxygen, A represents a vinylene, an ethylene or a phenylene group when Y represents selenium, A represents a vinylene, a phenylene or a naphthylene group when Y represents a vinylene group, A represents a phenylene group when Y represents a dialkylmethylene group and R represents an alkyl group.

What I claim as my invention and desire to be secured by Letters Patent of the United States is:

1. A process for the preparation of a dye comprising reacting, in the presence of a water-binding agent essentially comprising an anhydride of a fatty acid containing from two to four carbon atoms, an organic compound containing a nuclear reactive methylene group adjacent to a nuclear group selected from the group consisting of nuclear carbonyl and nuclear thiocarbonyl groups with a compound selected from the formylmethylene compounds of the following formulas:

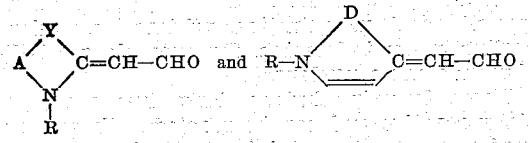

wherein A represents an organic group selected from the group consisting of vinylene, ethylene, phenylene and naphthylene groups when Y represents sulfur, A represents an organic group selected from the group consisting of vinylene, phenylene and naphthylene groups when Y represents oxygen. A represents an organic group selected from the group consisting of vinylene, ethylene and phenylene groups when Y represents selenium, A represents an organic group selected from the group consisting of vinylene, phenylene and naphthylene groups when Y represents a vinylene group, A represents a phenylene group when Y represents a dialkylmethylene group, D represents an organic group selected from the group consisting of vinylene and phenylene groups and R represents an alkyl group.

2. A process for the preparations of a dye comprising reacting, in the presence of an acetic anhydride water-binding agent, an organic compound containing a nuclear reactive methylene group adjacent to a nuclear group selected from the group consisting of nuclear carbonyl and nuclear thiocarbonyl groups with a compound selected from the formylmethylene compounds of the following formulas:

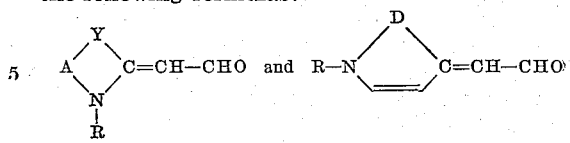

wherein A represents an organic group selected from the group consisting of vinylene, ethylene, phenylene and naphthylene groups when Y represents sulfur, A represents an organic group selected from the group consisting of vinylene, phenylene and naphthylene groups when Y represents oxygen, A represents an organic group selected from the group consisting of vinylene, ethylene, and phenylene groups when Y represents selenium, A represents an organic group selected from the group consisting of vinylene, phenylene, and naphthylene groups when Y represents a vinylene group, A represents a phenylene group when Y represents a dialkylmethylene group, D represents an organic group selected from the group consisting of vinylene and phenylene groups and R represents an alkyl group.

3. A process for the preparation of a dye comprising reacting, in the presence of a water-binding agent essentially comprising an anhydride of a fatty acid containing from two to four carbon atoms, a five-membered heterocyclic organic compound containing a nuclear reactive methylene group adjacent to a nuclear carbonyl group with a compound selected from the formylmethylene compounds of the following formulas:

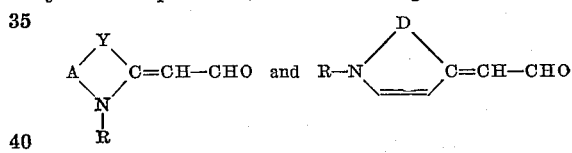

wherein A represents an organic group selected from the group consisting of vinylene, ethylene, phenylene and naphthylene groups when Y represents sulfur, A represents an organic group selected from the group consisting of vinylene, phenylene and naphthylene groups when Y represents oxygen, A represents an organic group selected from the group consisting of vinylene, ethylene and phenylene groups when Y represents selenium, A represents an organic group selected from the group consisting of vinylene, phenylene and naphthylene groups when Y represents a vinylene group, A represents a phenylene group when Y represents a dialkylmethylene group, D represents an organic group selected from the group consisting of vinylene and phenylene groups and R represents an alkyl group.

4. A process for the preparation of a dye comprising reacting, in the presence of an acetic anhydride water-binding agent, a five-membered heterocyclic organic compound containing a nuclear reactive methylene group adjacent to a nuclear carbonyl group with a compound selected from the formylmethylene compounds of the following formulas:

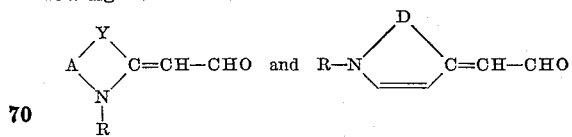

wherein A represents an organic group selected from the group consisting of vinylene, ethylene, phenylene and naphthylene groups when Y represents sulfur, A represents an organic group selected from the group consisting of vinylene, phenylene and naphthylene groups when Y represents oxygen, A represents an organic group selected from the group consisting of vinylene, ethylene and phenylene groups when Y represents selenium, A represents an organic group selected from the group consisting of vinylene, phenylene and naphthylene groups when Y represents a vinylene group, A represents a phenylene group when Y represents a dialkylmethylene group, D represents an organic group selected from the group consisting of vinylene and phenylene groups and R represents an alkyl group.

5. A process for the preparation of a dye comprising reacting, in the presence of a water-binding agent essentially comprising an anhydride of a fatty acid containing from two to four carbon atoms, a 2-thio-2, 4 (3, 5)-thiazoledione with a compound of the following formula:

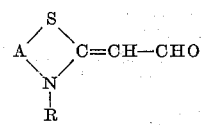

wherein A represents a naphthylene group and R represents an alkyl group.

6. A process for the preparation of a dye comprising reacting, in the presence of a water-binding agent essentially comprising an anhydride of a fatty acid containing from two to four carbon atoms, a 3-alkyl-2-thio-2, 4 (3, 5)-oxazoledione with a compound of the following formula:

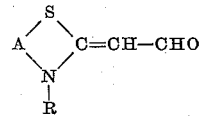

wherein A represents a naphthylene group and R represents an alkyl group.

7. A process for the preparation of a dye comprising reacting, in the presence of a water-binding agent essentially comprising an anhydride of a fatty acid containing from two to four carbon atoms, a 5-pyrazolone with a compound of the following formula:

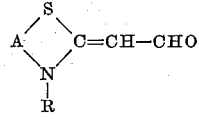

wherein A represents a naphthylene group and R represents an alkyl group.

8. A process for the preparation of a dye comprising reacting, in the presence of a water-binding agent essentially comprising an anhydride of a fatty acid containing from two to four carbon atoms, a 3-alkyl-2-thio-2, 4 (3, 5)-thiazoledione with a 1-alkyl-2-formylmethylene-β-naphthothiazoline.

9. A process for the preparation of a dye comprising reacting, in the presence of a water-binding agent essentially comprising an anhydride of a fatty acid containing from two to four carbon atoms, a 3-alkyl-2-thio-2, 4 (3, 5)-oxazoledione with a 1-alkyl-2-formylmethylene-β-naphthothiazoline.

10. A process for the preparation of a dye comprising reacting, in the presence of a water-binding agent essentially comprising an anhydride of a fatty acid containing from two to four carbon atoms, 1-(1-benzothiazyl)-3-methyl-5-pyrazolone with 1-alkyl-2-formylmethylene-β-naphthothiazoline.

11. A process for the preparation of a dye comprising reacting, in the presence of a water-binding agent essentially comprising an anhydride of a fatty acid containnig from two to four carbon atoms, a five-membered heterocyclic organic compound containing a nuclear reactive methylene group adjacent to a nuclear carbonyl group with a compound of the following formula:

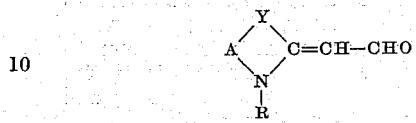

wherein A represents an organic group selected from the group consisting of vinylene, ethylene, phenylene and naphthylene groups when Y represents sulfur, A represents an organic group selected from the group consisting of vinylene, phenylene and naphthylene groups when Y represents oxygen, A represents an organic group selected from the group consisting of vinylene, ethylene, and phenylene groups when Y represents selenium, A represents an organic group selected from the group consisting of vinylene, phenylene and naphthylene groups when Y represents a vinylene group, A represents a phenylene group when Y represents a dialkylmethylene group and R represents an alkyl group.

12. A process for the preparation of a dye comprising reacting, in the presence of a water-binding agent essentially comprising an anhydride of a fatty acid containing from two to four carbon atoms, a five-membered heterocyclic organic compound containing a nuclear reactive methylene group adjacent to a nuclear carbonyl group with a compound of the following formula:

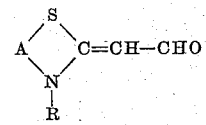

wherein A represents a naphthylene group and R represents an alkyl group.

LESLIE G. S. BROOKER.